United States Patent
Ostertag

(10) Patent No.: US 12,091,078 B2
(45) Date of Patent: Sep. 17, 2024

(54) STEERING APPARATUS FOR ACTIVELY CONTROLLING AN AT LEAST SEMI-AUTONOMOUSLY DRIVEN MOTOR VEHICLE

(71) Applicant: Dr. Ing. h.c. F. Porsche Aktiengesellschaft, Stuttgart (DE)

(72) Inventor: Jasmin Ostertag, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 18/108,884

(22) Filed: Feb. 13, 2023

(65) Prior Publication Data

US 2023/0356766 A1  Nov. 9, 2023

(30) Foreign Application Priority Data

May 5, 2022 (DE) ...................... 10 2022 111 084.2

(51) Int. Cl.
*B62D 1/183* (2006.01)
*B62D 1/04* (2006.01)

(52) U.S. Cl.
CPC ............... *B62D 1/183* (2013.01); *B62D 1/04* (2013.01)

(58) Field of Classification Search
None
See application file for complete search history.

(56) References Cited

U.S. PATENT DOCUMENTS 4,659,244 A * 4/1987 Malvy ................. B60R 25/0222
74/552
6,070,686 A 6/2000 Pollmann
(Continued)

FOREIGN PATENT DOCUMENTS

CN 113371052 A 9/2021
DE 102017223111 A1 * 6/2019
(Continued)

OTHER PUBLICATIONS

Great Britain Combined Search and Examination Report for Application No. GB2306531.1, dated Oct. 10, 2023, 4 pages.
(Continued)

*Primary Examiner* — Jason D Shanske
*Assistant Examiner* — Scott Lawrence Strickler
(74) *Attorney, Agent, or Firm* — Buchanan Ingersoll & Rooney PC

(57) ABSTRACT

A steering apparatus for actively controlling an at least semi-autonomously driven motor vehicle. The steering apparatus includes a steering body having an axis of rotation, a steering wheel handle and a steering wheel canister. The steering wheel handle and the steering wheel canister are rotatably connected to one another about an axis of rotation. An airbag module is arranged within the steering wheel canister, wherein the steering body has an active position and a stowed position, and is movable between these positions. In the active position, the steering body is rotatable about the axis of rotation for active control of a relevant motor vehicle. The airbag module is held in the steering wheel canister in a functionally identical orientation irrespective of the position of the steering body. An increase in the seating and movement freedom of the driver during a (fully) autonomous operation can be realized while maintaining safety.

15 Claims, 2 Drawing Sheets

(56) References Cited

U.S. PATENT DOCUMENTS

| | | | |
|---|---|---|---|
| 6,318,756 B1* | 11/2001 | Papandreou | B62D 1/10 74/552 |
| 11,247,713 B2* | 2/2022 | Nozawa | B62D 1/181 |
| 2017/0225570 A1* | 8/2017 | El Aile | B60K 35/50 |
| 2017/0267285 A1* | 9/2017 | Abbas | B60R 21/16 |
| 2017/0297606 A1* | 10/2017 | Kim | B62D 1/185 |
| 2019/0232975 A1 | 8/2019 | Kodera | |
| 2020/0055481 A1* | 2/2020 | Mimura | B60R 21/203 |
| 2020/0122767 A1 | 4/2020 | Reidel | |
| 2021/0124349 A1* | 4/2021 | Koehler | B62D 1/185 |
| 2021/0339792 A1* | 11/2021 | Kwon | B62D 1/10 |
| 2022/0274639 A1* | 9/2022 | Park | B62D 1/20 |
| 2023/0347967 A1* | 11/2023 | Roh | B60R 21/203 |

FOREIGN PATENT DOCUMENTS

| | | | | |
|---|---|---|---|---|
| EP | 3800109 A1 | 4/2021 | | |
| JP | H11-508510 A | 7/1999 | | |
| JP | 2002-193111 A | 7/2002 | | |
| JP | 2019-130935 A | 8/2019 | | |
| JP | 2020-522426 A | 7/2020 | | |
| JP | 2020-131958 A | 8/2020 | | |
| JP | 2021-020584 A | 2/2021 | | |
| WO | WO-2017060149 A1 * | 4/2017 | | B60R 21/09 |
| WO | WO-2023174651 A1 * | 9/2023 | | B62D 1/10 |

OTHER PUBLICATIONS

Great Britain Examination Report for Application No. GB2306531.1, dated Mar. 20, 2024. (1 page).

Office Action (Notice of Reasons for Refusal) issued Dec. 13, 2023, by the Japan Patent Office in corresponding Japanese Patent Application No. 2023-061904 and an English translation of the Office Action. (10 pages).

* cited by examiner

STEERING APPARATUS FOR ACTIVELY CONTROLLING AN AT LEAST SEMI-AUTONOMOUSLY DRIVEN MOTOR VEHICLE

CROSS-REFERENCE TO RELATED APPLICATION

This application claims priority to German Patent Application No. 10 2022 111 084.2, filed May 5, 2022, the content of such application being incorporated by reference herein in its entirety.

FIELD OF THE INVENTION

The invention relates to a steering apparatus for actively controlling an at least semi-autonomously driven motor vehicle. The invention furthermore relates to such a motor vehicle.

BACKGROUND OF THE INVENTION

Autonomous driving of motor vehicles is becoming viable due to the increasing computing capacities in a motor vehicle and the increasing speed of mobile data transmission. Driving is generally divided into manual operation, semi-autonomous operation, and (fully) autonomous operation, wherein, in the case of manual or semi-autonomous operation (for example, with an assistance system), a driver must continue to sit in the cockpit and intervene, i.e. actively control the motor vehicle as needed. The manual, semi-autonomous operation and (fully) autonomous operation can be implemented in the same motor vehicle, depending on the legislation and/or equipment of the motor vehicle. For example, a journey on a highway is (fully) autonomously executable, but a city journey still requires a driver to actively control the motor vehicle there.

In an actively controlled motor vehicle, it is correspondingly necessary for a steering body of a steering apparatus of the motor vehicle to protrude into the cockpit towards the driver in order to receive steering commands from the driver for actively controlling the motor vehicle. In a (fully) autonomous operation of the vehicle, on the other hand a cockpit area that is as free as possible is advantageous in order to ensure the driver as high a level of comfort as possible in the form of seating and movement freedom. Thus, an increase in the spatial comfort within the motor vehicle is to be ensured for the driver.

At the same time, however, the safety of the driver must be ensured, for example by measures such as the installation of airbags. It does not play a role in either (fully) autonomous operation of the vehicle or manual or semi-autonomous operation whether the steering body of the steering apparatus is arranged in a position for active control, for example, in urban traffic, or in an autonomous driving situation with the steering body displaced. In addition, the steering body of the steering apparatus must be easily and reliably movable between the position for active control and a position for autonomous driving so that the driver of the motor vehicle can rapidly actively intervene in the current driving situation.

The features of the claims can be combined in any technically meaningful manner, wherein the explanations from the following description as well as features from the figures, which comprise supplementary configurations of the invention, can also be used for this purpose.

SUMMARY OF THE INVENTION

The invention relates to a steering apparatus for actively controlling an at least semi-autonomously driven motor vehicle, comprising at least the following components:
 a steering body having an axis of rotation, wherein the steering body comprises a steering wheel handle and a steering wheel canister, wherein the steering wheel handle and the steering wheel canister are rotatably connected to one another about the axis of rotation; and
 an airbag module arranged within the steering wheel canister,
 wherein at least a part of the steering body has an active position and a stowed position, and is movable between these positions, and
 wherein in the active position the steering body is rotatable about the axis of rotation for active control of a relevant motor vehicle.

The steering apparatus is above all characterized in that the airbag module is held in the steering wheel canister in a functionally identical orientation irrespective of the position of the steering body.

Reference is made below to the aforementioned axis of rotation when the axial direction, radial direction, orbital direction, and corresponding terms are used, unless explicitly indicated otherwise. Ordinal numbers used in the description above and below are used only for clear differentiation and do not reflect any order or ranking of the designated components, unless explicitly indicated otherwise. An ordinal number greater than one does not necessitate that a further such component must necessarily be present.

The steering apparatus is arranged herein such that control of the at least semi-autonomously driven motor vehicle is manually executable such that steering movements of the driver are transferable to the motor vehicle. It should be noted that the word "active" is used in order to mean a manual control, which is not performed exclusively by an on-board computer and/or autonomous method, but rather by the driver of the motor vehicle. However, it is not ruled out that the driver is supported by assistance systems, for example a lane keeping assistant or a power steering system.

To transmit the steering movement, the steering apparatus comprises a steering body that is rotatably arranged about the axis of rotation. The steering body in turn comprises a steering wheel handle and a steering wheel canister. The steering wheel handle and the steering wheel canister are connected to one another such that they receive a steering movement of the driver and rotate about the axis of rotation accordingly.

In order to protect the driver in a crash event, an airbag module is also arranged within the steering wheel canister. Preferably, the airbag module used is an airbag module well-known to the person skilled in the art in industrial practice, which is adapted so as to inflate an airbag by gas within a few milliseconds in the event of a crash, so that the force of an impact is attenuated.

In order to move the steering body between manual or semi-autonomous operation with active driver control and (fully) autonomous operation, i.e. a driving situation without driver intervention, it is proposed here that at least a portion of the steering body be movable between two positions. The steering body is arranged in the active position such that the motor vehicle is actively controllable by the driver (preferably ergonomically) via the steering apparatus. The steering body is arranged in the stowed position in such a way that a cockpit area that is as free as possible can be produced as a result. When the steering body is arranged in the stowed position, a high level of comfort in the form of seating and movement freedom is ensured for the driver.

Switching from one mode of operation to another mode of operation, i.e. between a (fully) autonomous operation and a manual or semi-autonomous operation, is executable at the driver's initiative and/or an instruction from the motor vehicle. For example, regulatory requirements in some areas, for example, some inner-city regions, require the steering body to be arranged in the active position in order to operate the vehicle. If the motor vehicle is on a (fully) autonomous highway drive and will leave the highway in the next few minutes, wherein the steering body is arranged in the stowed position, the motor vehicle signals, for example, a timely exiting of (fully) autonomous operation, so that the driver must actively control the motor vehicle when driving off the highway. Thus, the driver is able to move the steering body from the stowed position into the active position before the motor vehicle leaves the highway into city traffic. Alternatively, the steering body is automatically movable from the motor vehicle into the active position or the motor vehicle can be turned off in order to prevent the motor vehicle from being driven without control or with non-legal control.

In the active position, the steering body is arranged such that it is rotatably supported about the axis of rotation. Preferably, the steering apparatus is configured such that the motor vehicle is manually controllable only within the active position. If the steering body is arranged outside of the active position, the steering body is not configured to actively control the motor vehicle, such that unwanted control of the motor vehicle is ruled out.

Here, it is now proposed that, regardless of the position of the steering body, the airbag module has a functionally identical orientation, i.e. the airbag module is correctly aligned in a crash event in order to reduce an impact on the driver. In this case, the airbag module is held in the steering wheel canister such that in a crash event, the airbag can be correctly inflated. In this context, correct means that the airbag meets the legal requirements for the safety of the driver, regardless of the position of the steering body or the manual, semi-autonomous, or (fully) autonomous operation of the motor vehicle. Thus, at any time in the operation of the motor vehicle, a functionally identical use of the airbag module can be realized. Preferably, the airbag module is accordingly directed towards the same body areas of the driver, regardless of the position of the steering body. For example, the steering wheel canister comprises a rigidly arranged part (canister part) in which the airbag module is arranged. Preferably, the rigid canister part is not pivotable relative to the rest of the cockpit, or at a maximum at a slight angle, for example up to 5° in both directions.

However, in one embodiment, the rigid canister part of the steering wheel canister is translationally movable along the axis of rotation.

It should be noted that the steering wheel canister is mechanically stable so that, in a crash event, the steering wheel canister with the airbag module remains correctly oriented towards the driver. For example, the steering wheel canister is attached to a mechanically formed steering column or (in a steering apparatus without a steering column, for example steer-by-wire) to a corresponding reinforcing structure, for example in the dashboard of the motor vehicle.

The device according to aspects of the invention offers the advantage that, in the stowed position, a comfortable space is created in the cockpit and, in the active position, a manual, active control of the motor vehicle is possible. Further, in both positions, a high level of safety of the driver is ensured by a functionally capable and correctly aligned airbag module.

The pivot axis is not necessarily a physically formed steering axis. However, in one embodiment example, the pivot axis is a physically configured steering axis for mechanically transferring a steering command for controlling the vehicle. In some embodiments, the transmission of the steering command occurs in a non-mechanical manner, or not an exclusively mechanical manner, for example by means of an electrical signal, such that a physically formed steering axis is not necessary.

In one embodiment, the steering axis is a conventionally arranged steering column having a steering gear, wherein a direction of travel of a motor vehicle can be realized by means of the steering gear. The steering gear translates the steering movement of the steering body or steering wheel handle into a sliding movement on a tie rod of the motor vehicle so that the vehicle wheels are rotated into a different steering orientation than the current main direction of travel of the motor vehicle.

In an alternative embodiment, the steering axis is configured with a servo motor such that the servo motor assists the driver in the control, in that the force applied by the driver to the control is more strongly transferable to the vehicle wheels via a hydraulic system and/or an electric motor. In this embodiment, the transmission of the steering movement is carried out not directly by means of a power-receiving steering column or a steering gear, but rather by means of a torque in the same direction as the steering movement, such that less force must be applied to the steering body or steering wheel handle in order to change the steering orientation.

In a further alternative embodiment, the steering axis is configured as a so-called steer-by-wire system, in which the steering axis is configured as a theoretical axis of rotation. For example, the steering apparatus here comprises a so-called steering force simulator, which senses the steering impact of the steering body or the steering wheel handle. Furthermore, a variable steering force and a mechanical limit stop are preferably simulated by means of an integrated, electrically operable brake. The steering movement is generated electronically and/or hydraulically (for example, via proportional valves actuated by an electronic control unit).

It is further proposed, in an advantageous embodiment of the steering apparatus, that the steering wheel handle, preferably configured as a steering wheel rim, be releasably connected to the steering wheel canister, wherein, in the active position, the steering wheel handle is fixed to the steering wheel canister for a torque transmission, and, in the stowed position, the steering wheel handle is disassembled from the steering wheel canister.

The steering wheel handle is releasably fixable to the steering wheel canister. That is to say, it can be reversibly connected to the steering wheel canister, or fixed to and then released from the steering wheel canister. Here, "releasable" further means a connection that is quickly releasable by the driver and without tools (preferably during a (fully) autonomous operation, for example by a button push).

Preferably, the steering wheel handle is a steering wheel rim (particularly preferably of a circumferential configuration). The steering wheel rim is preferably spaced apart from the steering wheel canister such that it is graspable by a driver.

For example, the steering movements of the driver are transferable to the axis of rotation by means of the steering wheel handle, and thus to the vehicle wheels of a motor vehicle. The steering wheel rim is a circumferential component, which is arranged about the axis of rotation. For example, by means of a plurality of spokes arranged so as to run radially inward from the steering wheel rim to the steering wheel canister, the steering wheel rim is supported on the steering wheel canister. Preferably, the steering wheel rim is also spaced apart from the steering wheel canister in the axial direction via the spokes, particularly preferably in the direction of the driver.

Such a steering wheel rim provides a particularly secure handling of the steering apparatus when actively controlling the motor vehicle, because the steering wheel rim can be grasped by the driver. Further, via an axial spacing of the steering wheel rim from the steering wheel canister, a particularly ergonomic handling of the steering apparatus by the driver is possible.

If the steering body is in the active position, the steering wheel handle is fixed to the steering wheel canister and is configured for a torque transmission.

In the stowed position, by contrast, the steering wheel handle is reversibly disassembled from the remaining steering body according to the embodiment proposed herein. Preferably, the steering wheel handle is completely detachable and removable from the steering wheel canister, for example in a separate storage space in the dashboard, or attachable to a mount provided for this purpose.

In an alternative embodiment, the disassembly is carried out by means of a folding mechanism such that the steering wheel handle is hinged away from the steering wheel canister. For example, a hinge is arranged between the steering wheel handle and the steering wheel canister.

This embodiment has the advantage that it creates a particularly large amount of space in the cockpit and thus provides a particularly comfortable space for the driver in a (fully) autonomous operation.

It is further proposed, in an advantageous embodiment of the steering apparatus, that the steering wheel handle be releasably connected to the steering wheel canister by way of a latch.

In one embodiment, the latch is arranged such that the steering wheel handle has a plurality of pins snap-fit into complementary openings in the steering wheel canister. For example, in this embodiment, a spring mechanism is arranged on the steering wheel canister. By means of the spring mechanism, for example, a snap-in hook can be inserted into a recess in at least one of the pins of the steering wheel handle for producing a positive-lock connection. Such a positive-lock connection is releasable, for example, via a switch on the steering wheel canister and/or the steering wheel handle, such that the steering wheel handle is removable from the steering wheel canister.

In alternative embodiments, the steering wheel handle is connected to the steering wheel canister by means of an electromotive or magnetically driven latching mechanism, by way of a bayonet fastener, by means of a screw connection, by means of a clicking hinge, or the like.

A connection of the steering wheel handle to the steering wheel canister by means of such a latching feature offers the advantage that it is particularly easily and quickly detachable for the driver and still ensures a firm hold and thus a high degree of safety.

In an advantageous embodiment of the steering apparatus, it is further proposed that the steering wheel canister comprise a first canister portion and a second canister portion, which are movable relative to one another, wherein the airbag module is received in the second canister part, and wherein, at least in the active position, the first canister part of the steering wheel canister is connected to the steering wheel handle and the second canister part of the steering wheel canister in a torque-transmitting manner, wherein the first canister part is preferably pivotally mounted between the active position and the stowed position about a pivot axis.

According to this embodiment, it is now proposed that the steering wheel canister be arranged in two parts. Thus, the steering wheel canister comprises a first canister part and a second canister part, wherein these are supported such that they are movable relative to one another. For example, in addition to receiving the airbag module, the steering wheel canister is configured for receiving electronic components, preferably for operating and controlling the motor vehicle.

In order to ensure the functionally identical orientation of the second canister part, it is now proposed here that the airbag module be received in the second canister part, and the second canister part is fixed to the axis of rotation. Due to the fixing of the second canister part to the axis of rotation, the airbag module remains identically aligned and stationary, regardless of a movement of the first canister part. Thus, a proper operation of the airbag module is ensured.

In the active position, the first canister part is connected to the steering wheel handle and the second canister part in a torque-transmitting manner, such that a transmission of torque of a steering movement from the steering wheel handle to both canister parts of the steering wheel canister can be realized. In one embodiment example of this embodiment, the steering wheel handle is connected to the steering wheel canister and the first canister portion in a non-releasable manner. In this case, "not releasable" means that a user cannot easily and with a few simple acts (for example, during travel when switching from an actively controlled mode of operation to an autonomous mode of operation) loosen the connection between the first canister part of the steering wheel canister and the steering wheel handle. However, a release of the connection as known from industrial practice (e.g. with tools) is not ruled out.

Preferably, the first canister part is pivotably supported between the active position and the stowed position about a pivot axis, wherein the connection of the first canister part to the second canister part in a torque-transmitting manner is released outside the active position such that the second canister part ensures the functionally identical operation of the received airbag module. The pivot axis is preferably arranged orthogonally to the axis of rotation and, in one embodiment, within a technical component by means of which the pivoting of the first canister part is executable. For example, the pivot axis is arranged within a bearing, and the bearing is arranged with the pivot axis transverse to the axis of rotation and connected to the first canister part by means of a lever arm, such that it can be pivoted about the pivot axis.

In an alternative embodiment, the pivot axis is a theoretical axis about which the first canister part is pivotally supported between the active position and the stowed position. For example, the first canister part is pivotable along a curved rail into the stowed position such that the pivot axis represents the theoretical center point of the curved rail and is optionally arranged horizontally (from the driver's perspective) further away from the steering wheel canister than the pivot axis in the above embodiment.

Such an embodiment with two canister parts offers the advantage that, even without disassembly of the steering wheel handle, space can be created for the driver in the cockpit during (fully) autonomous operation. Further, no disassembly or receiving of a disassembled steering wheel handle is necessary.

It is further proposed in an advantageous embodiment of the steering apparatus that the steering wheel canister comprise an operator element by which vehicle functions are operable by a driver.

The vehicle functions are thus operable by the driver at least in the active position, preferably also in the stowed position, of the steering body. For example, such vehicle functions are infotainment functions, assistance systems such as lane-keeping assistants and/or speed regulators of the motor vehicle, a shift, or the selection of operating modes. Further, for example, the steering wheel handle is releasable by means of the operator element or the first canister part is releasable and/or pivotable away from the second canister part. In one embodiment, in the stowed position, when the vehicle is operated (fully) autonomously by means of the operator element, only vehicle functions are operable for the infotainment system, for example the volume of the sound system or the play/pause button, such that in the (fully) autonomous operation, accidentally adjusting the vehicle functions of the vehicle is ruled out.

One embodiment having such an operator element provides the advantage of a particularly convenient operation of vehicle functions in (fully) autonomous operation as well as in manual or semi-autonomous operation.

It is further proposed in an advantageous embodiment of the steering apparatus that an axial offset be formed between the steering wheel canister and the steering wheel handle.

According to such an embodiment, the steering wheel handle is connected to the steering wheel canister at least in the active position such that it is axially spaced apart from it, i.e. has an axial offset from it. The offset represents the axial distance between the steering wheel canister and the steering wheel handle. Thus, the steering wheel handle (preferably configured as a steering wheel rim) is graspable by the driver and can be ergonomically and securely held.

The axial offset is adjustable, for example, by way of a latch according to an above embodiment. Preferably, the axial offset is adjustable by way of the latch such that the axial distance of the steering wheel handle is shortened or increased in the direction of the driver.

In one embodiment, the pins have a plurality of notches for the spring mechanism such that the offset is thus preferably ergonomically adjustable.

In an alternative embodiment, the steering wheel canister has a plurality of latches for a bayonet seal, such that the offset between the steering wheel handle and the steering wheel canister is adjustable by way of the axial distance of the latches.

According to a further aspect, a motor vehicle is proposed, comprising at least the following components:
  at least one drive machine;
  at least one steerable vehicle wheel; and
  at least one cockpit having a dashboard and a steering apparatus according to an embodiment described above,
wherein the steering apparatus is configured so as to control the motor vehicle, receive a steering command from the driver, and convert it into a torque transmission to at least one of the steerable vehicle wheels for a steering orientation of the relevant steerable vehicle wheel corresponding to the steering command.

The motor vehicle proposed herein is equipped with a drive machine and at least one steerable vehicle wheel so that it can autonomously move and, if necessary, control itself. Preferably, such a motor vehicle is a passenger vehicle, particularly preferably a sports vehicle. A dashboard is arranged within the motor vehicle, and a steering apparatus according to one embodiment according to the above description is arranged within the dashboard. For example, an infotainment system having a plurality of screens is arranged within the dashboard.

The steering apparatus is configured so as to control the motor vehicle, such that a steering command of a driver is transferable to the vehicle wheels and thus a new steering orientation of the vehicle wheels can be realized. In one embodiment, the steering command is transferable to the vehicle wheels by means of a conventionally arranged steering column having a steering gear, wherein the direction of travel of a motor vehicle can be influenced by means of the steering gear. The steering gear translates the steering command of the steering body or the driver into a sliding movement on a tie rod of the motor vehicle so that the vehicle wheels are rotated into a different steering orientation than the current main direction of travel of the motor vehicle.

In an alternative embodiment, the steering command is transferable to the vehicle wheels by means of a servo motor, wherein the servo motor assists the driver by more strongly transferring the force produced by the driver for control to the vehicle wheels by means of a hydraulic system and/or an electric motor. In this embodiment, the transmission of the steering command is performed not directly by means of a power-receiving steering column or a steering gear, but rather by means of a torque aligned with the steering command, such that less force must be applied to the steering body or steering wheel handle in order to change the steering orientation.

In a further alternative embodiment, the steering command is transferable to the vehicle wheels by means of a so-called steer-by-wire system, the steering axis being configured as a theoretical axis of rotation. For example, the steering apparatus comprises a so-called steering force simulator, which on the one hand senses the steering impact of the steering body or the steering wheel handle and on the other hand simulates a variable steering force and a mechanical limit stop by means of an integrated electrically actuated brake. The steering command is generated electronically and/or hydraulically (for example, via proportional valves actuated by an electronic control unit) and transmitted to the vehicle wheels.

It is further proposed in an advantageous embodiment of the motor vehicle that the steering wheel canister be stowed in a holder in a dashboard of the motor vehicle, wherein the steering wheel canister is preferably translationally movable along the axis of rotation.

Here, it is now proposed that the dashboard comprises a receptacle, wherein the receptacle is configured for storing the steering wheel canister. In one embodiment, the stowing of the steering wheel canister is executable only without the steering wheel handle and in the stowed position of the steering body. For example, the receptacle is designed such that only the steering wheel canister without the steering wheel handle is stowable in the receptacle.

In an alternative embodiment, the receptacle is designed such that the steering wheel canister is stowed with the steering wheel handle in the stowed position in the receptacle. For example, in this embodiment, the receptacle has a recess for the steering wheel canister and the steering wheel handle such that it can be stowed in the receptacle while the steering wheel canister is connected to the steering wheel handle.

In a further alternative embodiment, the steering wheel canister with the steering wheel handle is stowable in the active position in the receptacle of the dashboard. For example, the motor vehicle is in a semi-autonomous operation mode and the driver of the motor vehicle leaves the steering body in the active position, wherein in this embodiment there is the possibility of stowing the steering wheel canister with or without the steering wheel handle into the receptacle of the dashboard. Thus, an increase in the spatial comfort within the motor vehicle can be realized for the driver in the active position of the steering body. At the same time, the driver still has the option of intervening in the driving process in the active position.

In a preferred embodiment, the steering wheel canister is translationally stowed along the axis of rotation into the receptacle of the dashboard. In this preferred embodiment, the movement of the steering body between the active position and the stowed position occurs translationally along the axis of rotation, wherein, in a (fully) autonomous operation of the motor vehicle, the driver can move the steering wheel canister into the receptacle of the dashboard with or without the steering wheel handle. The stowed position is blocked for the steering wheel canister in a semi-autonomous operation, such that an unwanted pivoting of the steering wheel canister into the stowed position, for example during a city trip, is ruled out.

It should be noted that, in the embodiments described above, the operator element, which may be part of the steering wheel canister, is preferably at least partially further operable when the steering wheel canister is received in the receptacle with or without the steering wheel handle. Furthermore, it should be noted that the translational movement of the steering wheel canister is executable along the axis of rotation by a carriage mechanism or a telescoping mechanism. Alternatively or additionally, the translational movement of the steering wheel canister is executable by means of a linkage and a plurality of rotational bearings along the axis of rotation, wherein the airbag module can be operated in a functionally identical manner, taking into account minimum angle changes.

It is further proposed, in an advantageous embodiment of the motor vehicle, that the stowable portion of the steering body be fixable in the stowed position, preferably on the dashboard of the motor vehicle.

By means of the fixing proposed here, an unwanted pivoting of the steering body out of the stowed position is prevented. For example, the fixing is configured as a snap mechanism or an electromagnetic lock, which only releases the steering body from the fixing upon actuation of a triggering function. For this purpose, the steering wheel canister and/or the steering wheel handle comprises a corresponding counterpart, preferably on the side facing away from the driver, such that the steering body is releasably fixable to the dashboard of the motor vehicle. Particularly preferably, in the active position, the fixing mechanism is arranged inconspicuously outside the direct field of view of the driver.

BRIEF DESCRIPTION OF THE DRAWINGS

The invention described above is explained in detail below with reference to the accompanying drawings, which show preferred configurations, in light of the relevant technical background. The invention is not limited in any way by the purely schematic drawings, wherein it is noted that the drawings are not true to size and are not suitable for defining proportions. Here.

DETAILED DESCRIPTION OF THE INVENTION

Figure 1:
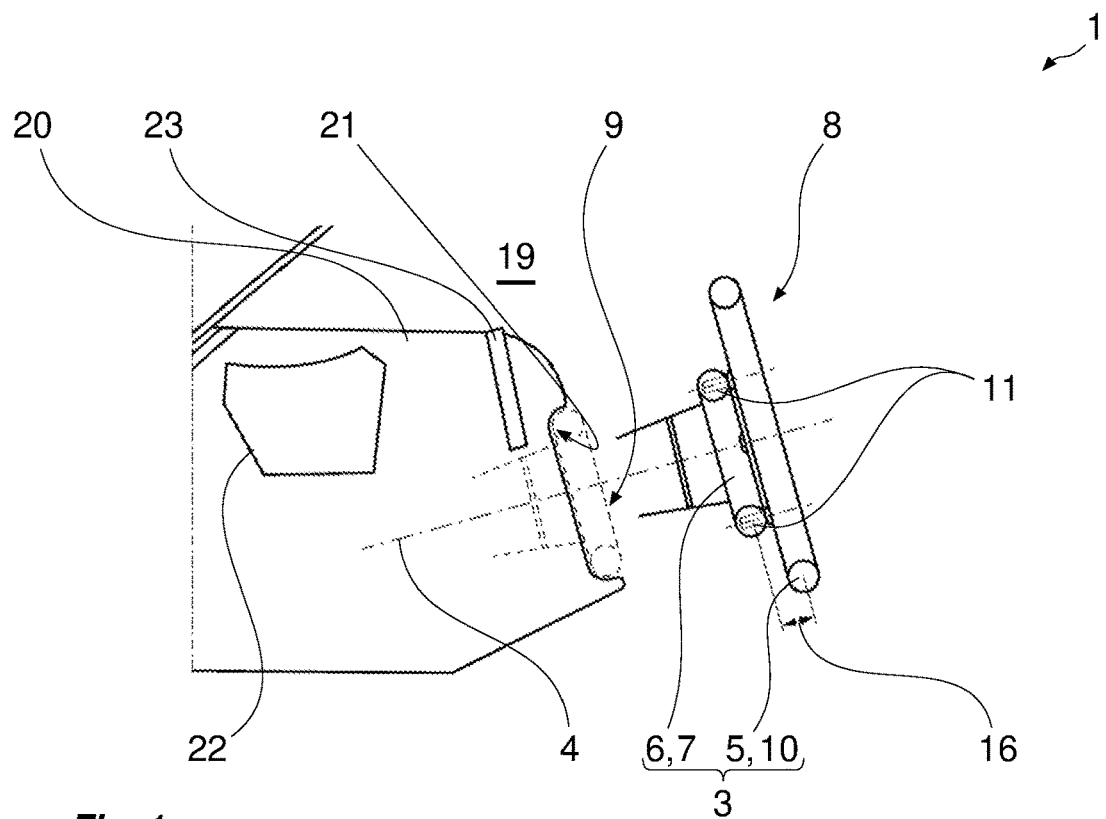
FIG. 1: shows a steering apparatus in a schematic sectional view.

In FIG. 1, a steering apparatus 1 is shown in a schematic sectional view. The steering apparatus 1 comprises a steering body 3 and an axis of rotation 4, wherein the axis of rotation 4 is arranged coaxially to the steering body 3. The steering body 3 comprises a steering wheel canister 6 and a steering wheel handle 5, wherein the steering wheel handle 5 in this embodiment example is configured as a steering wheel rim 10 and is releasably connected to the steering wheel canister 6 by way of a latch 11. The latch 11 is configured in this embodiment example as a plurality of pins received by the steering wheel canister 6. By means of the latch 11, for example by means of a plurality of notches within the pins, an axial offset 16 between the steering wheel canister 6 and the steering wheel handle 5 is adjustable. By way of the offset 16, an ergonomic position of the steering wheel handle 5 is preferably adjustable for the driver.

An airbag module 7 is arranged within the steering wheel canister 6, wherein the airbag module 7 is oriented in its direction of action towards the driver of a motor vehicle 2. The steering body 3 is arranged in an active position 8 in the right situation according to the illustration (drawn in solid lines), such that in a semi-autonomous or manual operation of the motor vehicle 2, the motor vehicle 2 is actively controllable by the driver. If the motor vehicle 2 is in (fully) autonomous operation, the steering body 3 is movable into a stowed position 9 (shown here by a dashed line). To store the steering body 3 within the dashboard 20, a receptacle 21 is provided, which receives the steering wheel canister 6 in this embodiment example. In this embodiment example, the steering wheel handle 5 is separably connected to the steering wheel canister 6 such that the steering wheel handle 5 is disassembled from the steering wheel canister 6 in the stowed position 9. The steering wheel canister 6 is translationally movable from the active position 8 in the stowed position 9 into the receptacle 21 via a telescoping mechanism along the axis of rotation 4. In an alternative embodiment example, the steering wheel canister 6 is translationally movable into the receptacle 21 along the axis of rotation 4 by means of a carriage.

Due to the movability of the steering body 3 between the active position 8 and the stowed position 9, an increase in the seating and comfort need for the driver in a cockpit 19 can be realized within a (fully) autonomous operation of the motor vehicle 2. Purely optionally, a head-up display 22 and a speedometer display 23 are arranged in the dashboard 20 as shown, via which vehicle information, for example the speed of the motor vehicle 2, display of an infotainment system, or navigational display, can be graphically presented to the driver during a manual, a semi-autonomous, or a (fully) autonomous operation. Preferably, in a (fully)

autonomous operation, the tachometer display 23 is turned off and only the head-up display 22 is used. Conversely, for example, in a manual or semi-autonomous operation, only the tachometer display 23 can be used and the head-up display 22 can be turned off.

Figure 2:
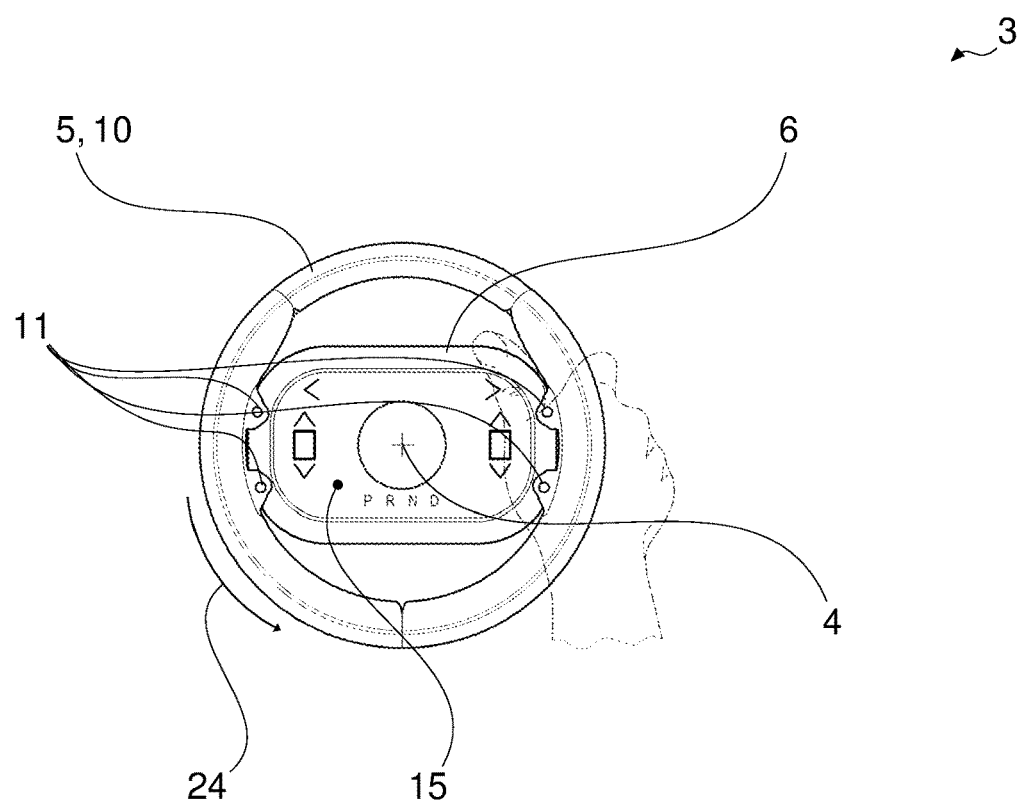
FIG. 2: shows the steering body according to FIG. 1 in a front view.

In FIG. 2, the steering body 3 according to FIG. 1 is shown in a front view. The steering body 3 is arranged in a coaxially rotatable manner to the axis of rotation 4, wherein the steering body 3 comprises a steering wheel canister 6 and a steering wheel handle 5. The steering wheel handle 5 is adapted for transmitting the torque of a steering movement 24 of the driver of a motor vehicle 2. In this embodiment example, the steering wheel handle 5 is configured as a steering wheel rim 10, wherein the steering wheel rim 10 is configured so as to be grasped by the driver's hand. The steering wheel handle 5 is releasably fixed to the steering wheel canister 6 by means of a locking mechanism 11, in this embodiment example by means of four pins. Due to the latch 11, the steering wheel handle 5 is securely fastened in a torque-transmitting manner and yet quickly and easily releasably attached to the steering wheel canister 6.

The steering wheel canister 6 further comprises an operator element 15, which is configured so as to operate vehicle functions. For example, the speed of a speed assistant can be adjusted and/or an infotainment system can be actuated by means of the operator element 15. Furthermore, the turning signals of the motor vehicle 2 can be controlled by means of the operator element 15. Also shown in this embodiment example is a display of the current gear of a transmission 25 on the operator element 15.

Figure 3:
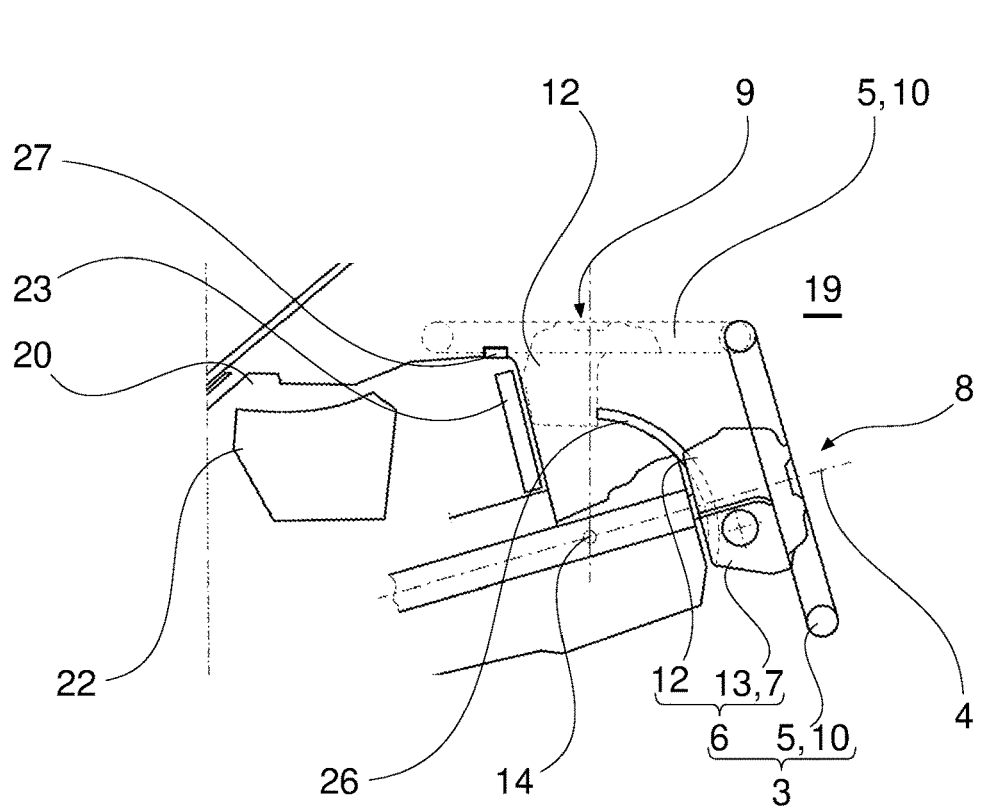
FIG. 3: shows a steering apparatus in an alternative embodiment example in a schematic cross-sectional view.

In FIG. 3, a steering apparatus 1 in an alternative embodiment example is shown in a schematic sectional view. The steering apparatus 1 comprises an axis of rotation here 4, about which a steering body 3 is arranged coaxially. The steering body 3 further comprises a steering wheel handle 5 and a steering wheel canister 6, wherein the steering wheel canister 6 comprises a first canister part 12 and a second canister part 13, and the second canister part 13 is connected in a torque-transmitting manner to the first canister part 12 and the steering wheel handle 5 in an active position 8. In the active position 8 according to the illustration (drawn in solid lines), the canister parts 12, 13 are connected to one another such that a torque transmission or a steering movement 24 can be realized by means of the steering wheel handle 5 for controlling a motor vehicle 2. The steering movement 24 is transferable in the active position 8 from the steering wheel handle 5 via the steering wheel canister 6 to the axis of rotation 4, which is a physically configured steering column, as shown in the illustration. An airbag module 7 is arranged within the second canister part 13, wherein the airbag module 7 is configured so as to reduce an impact of the driver in a crash event. At least a part of the steering body 3 can be pivoted between the active position 8 and a stowed position 9 along the pivot axis 14. The pivoting into the stowed position 9 is carried out by means of purely optional curved rails 26, wherein the pivot axis 14 thus represents a theoretical pivot axis 14.

Here, the stowed position 9 of the steering body 3 is shown by dashed lines. In this embodiment example, the second canister part 13 is detached from the first canister part 12 and positioned such that the second canister part 13 remains in an unchanged position and orientation compared to an active operation of the vehicle (with the first canister part 12 in the active position 8), such that the airbag module 7 is also operable in the stowed position 9 of the steering body 3. A fixing element 27 is arranged on the dashboard 20, which is configured for fixing the steering wheel handle 5 with a corresponding counterpart and for fixing the steering wheel handle 5 in the stowed position 9. For example, the fixing element 27 is configured as a clipping mechanism and/or as a magnet, which releases the steering wheel handle 5 with the corresponding counterpart from the fixing only by separately actuating the triggering of the fixing element 27. Further, a purely optional head-up display 22 and a purely optional tachometer display 23 are arranged in the dashboard 20. The tachometer display 23 in the stowed position 9 is thereby obscured by the first canister part 12 and the steering wheel handle 5, so that in this case (the (fully) autonomous operation of the motor vehicle 2) only the head-up display 22 is applicable.

Figure 4:
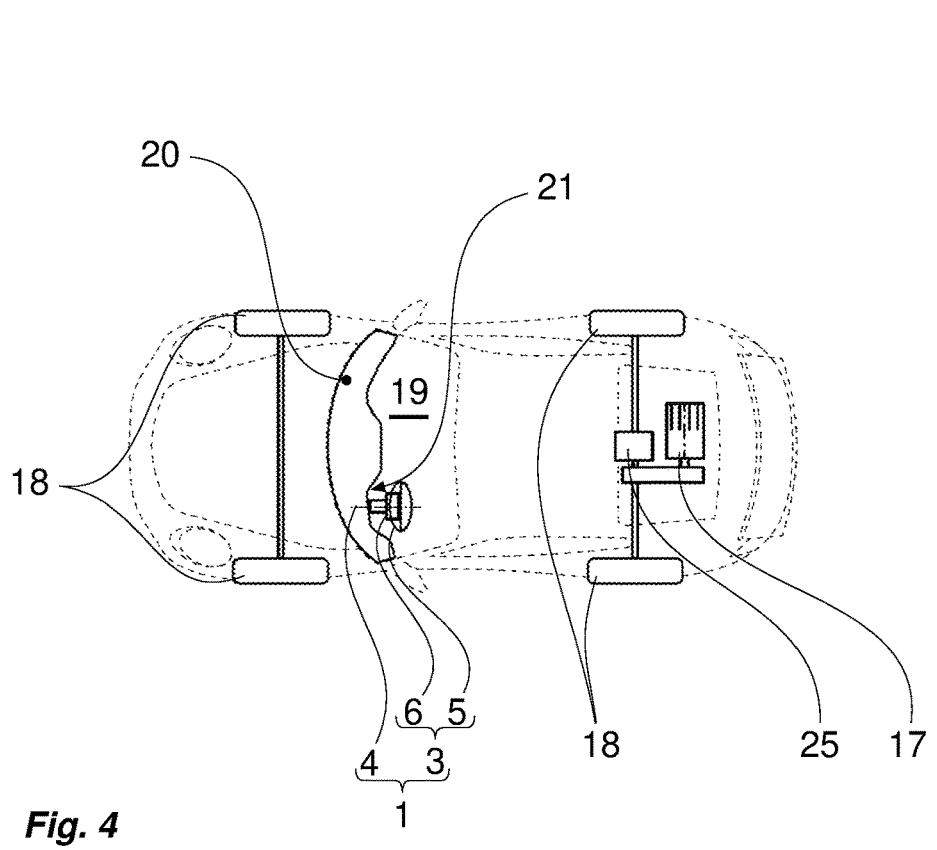
FIG. 4: shows a motor vehicle having a dashboard.

FIG. 4 shows an autonomous motor vehicle 2, which is optionally operable in (fully) automatic mode or in a manual or semi-autonomous mode.

The motor vehicle 2 comprises a drive machine 17, configured as an electric traction machine in this embodiment example, and a transmission 25. The drive machine 17 is configured so as to generate a torque, and the transmission 25 is configured so as to transmit the torque to a plurality of vehicle wheels 18 such that the torque is transferable to the substrate and the motor vehicle 2 can thus be propelled. A front wheel axle having two vehicle wheels 18 is configured as a steerable axle for controlling the vehicle.

A cockpit 19 is arranged within the motor vehicle 2, wherein the cockpit 19 is configured for at least one driver of the motor vehicle 2. The cockpit 19 comprises a dashboard 20, which in turn comprises a receptacle 21 in which at least a part of a steering body 3 of a steering apparatus 1 is stowed away in a stowed position 9 when the motor vehicle 2 is (fully) autonomously operated. The steering apparatus 1 further comprises an axis of rotation 4, wherein the steering body 3 is preferably arranged coaxially about the axis of rotation 4 in an active position 8 in order to actively control the motor vehicle 2 in a manual or semi-autonomous operation. Furthermore, the steering body 3 comprises a steering wheel handle 5, configured here as a steering wheel rim 10, and a steering wheel canister 6, wherein the steering wheel canister 6 is adapted to transmit a steering movement 24 of the driver to the vehicle wheels 18.

The invention relates to a steering apparatus for actively controlling an at least semi-autonomously driven motor vehicle, comprising at least the following components:
  a steering body having an axis of rotation, wherein the steering body comprises a steering wheel handle and a steering wheel canister, wherein the steering wheel handle and the steering wheel canister are rotatably connected to one another about the axis of rotation; and
  an airbag module arranged within the steering wheel canister,
  wherein at least a part of the steering body has an active position and a stowed position, and is movable between these positions, and
  wherein in the active position the steering body is rotatable about the axis of rotation for active control of a relevant motor vehicle. The steering apparatus is characterized in particular in that the airbag module is held in the steering wheel canister in a functionally identical orientation irrespective of the position of the steering body.

With the steering apparatus proposed herein, an increase in the seating and movement freedom of the driver of a motor vehicle during a (fully) autonomous operation can be realized while maintaining safety in a crash event.

What is claimed:

1. A steering apparatus for actively controlling an at least semi-autonomously driven motor vehicle, said steering apparatus comprising:
    a steering body having an axis of rotation, wherein the steering body comprises a steering wheel handle and a steering wheel canister, wherein the steering wheel handle and the steering wheel canister are rotatably connected to one another about the axis of rotation, wherein the steering wheel canister comprises a first canister portion and a second canister portion that are movable relative to one another; and
    an airbag module arranged within the second canister part of the steering wheel canister, wherein at least a part of the steering body has both an active position and a stowed position and is movable between the active and stowed positions,
    wherein, in the active position, the steering body is rotatable about the axis of rotation for active control of the motor vehicle,
    wherein the airbag module is held in the second canister part of the steering wheel canister in a functionally identical orientation irrespective of the position of the steering body,
    wherein, in the active position, the first canister part of the steering wheel canister is connected to the steering wheel handle and the second canister part of the steering wheel canister in a torque-transmitting manner,
    wherein, in the stowed position, the second canister part of the steering wheel canister is disconnected from the first canister part while the first canister part of the steering wheel canister remains connected to the steering wheel handle.

2. The steering apparatus according to claim 1, wherein the steering wheel handle is releasably connected to the steering wheel canister, wherein, in the active position, the steering wheel handle is fixed to the steering wheel canister for a torque transmission.

3. The steering apparatus according to claim 2, wherein the steering wheel handle is releasably connected to the steering wheel canister by a latch.

4. The steering apparatus according to claim 1, wherein the first canister part is pivotally mounted between the active position and the stowed position about a pivot axis.

5. The steering apparatus according to claim 1, wherein the steering wheel canister comprises an operator element by which vehicle functions can be operated by a driver.

6. The steering apparatus according to claim 1, wherein an axial offset is defined between the steering wheel canister and the steering wheel handle.

7. A motor vehicle comprising:
    at least one drive machine;
    at least one steerable vehicle wheel; and
    at least one cockpit having a dashboard and the steering apparatus according to claim 1,
    wherein the steering apparatus is configured to control the motor vehicle, receive a steering command from the driver, and convert the steering command into a torque transmission to the at least one steerable vehicle wheel for a steering orientation of the at least one steerable vehicle wheel corresponding to the steering command.

8. The motor vehicle according to claim 7, wherein a stowable part of the steering body is fixable in the stowed position on the dashboard of the motor vehicle.

9. A motor vehicle comprising the steering apparatus according to claim 1.

10. The steering apparatus according to claim 1, wherein in the active position, the steering wheel handle encircles the first and second canister parts of the steering wheel canister.

11. The steering apparatus according to claim 10, wherein in the stowed position, the steering wheel handle encircles the first canister part but does not encircle the second canister part.

12. The steering apparatus according to claim 1, wherein in the active position, the first canister part is positioned at an elevation above the second canister part.

13. The steering apparatus according to claim 1, wherein the first canister part contains vehicle electronics including a vehicle function display.

14. The steering apparatus according to claim 1, wherein in the active position, the first canister part at least partially conceals the second canister part.

15. The steering apparatus according to claim 1, wherein in the active position, the first canister part is centered on the axis of rotation of the steering body.

* * * * *